No. 793,083. PATENTED JUNE 27, 1905.
J. F. MEIGS & E. GATHMANN.
APPARATUS FOR INDICATING THE POSITIONS OF MOVING TARGETS.
APPLICATION FILED MAY 6, 1903.
4 SHEETS—SHEET 2.
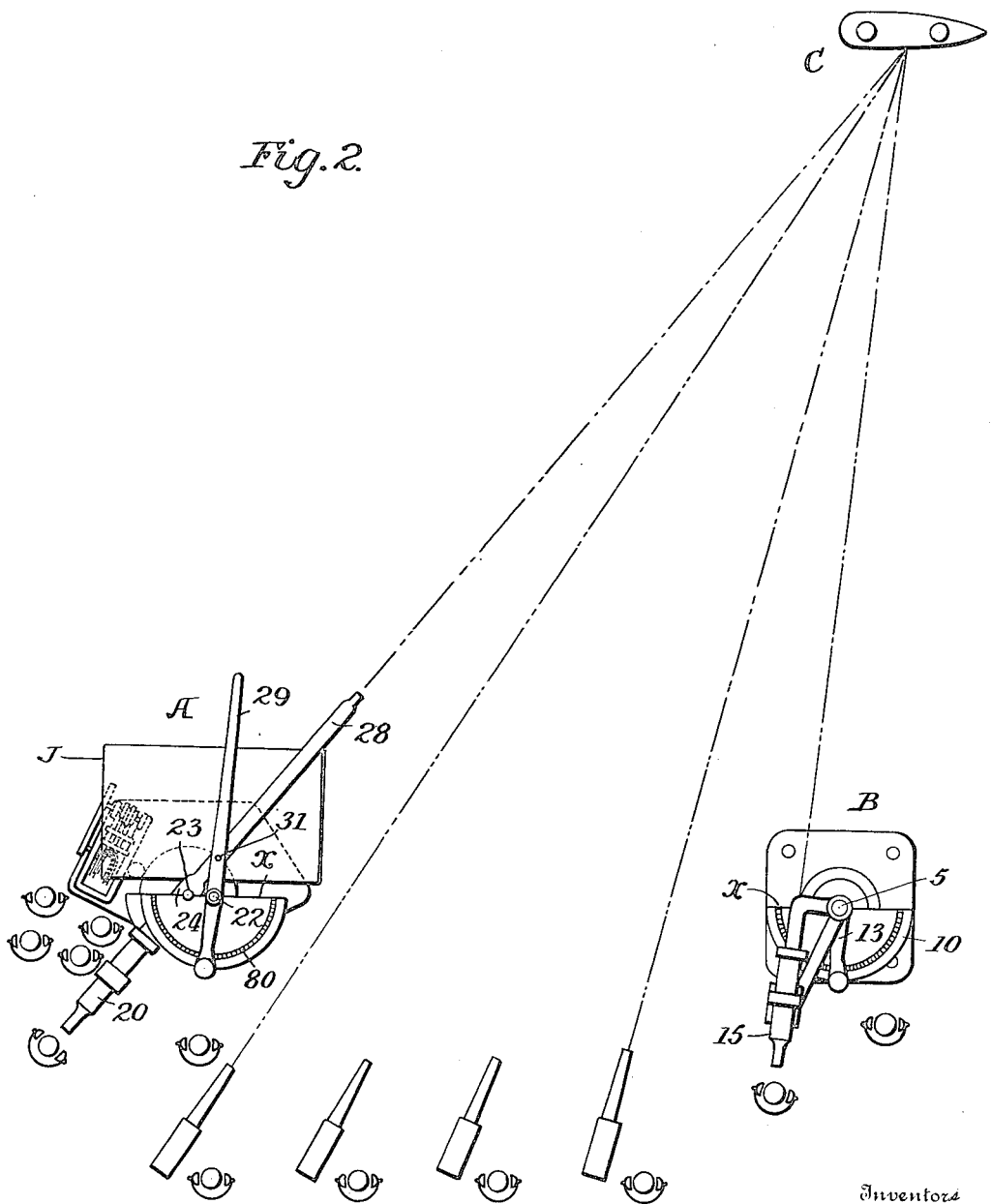

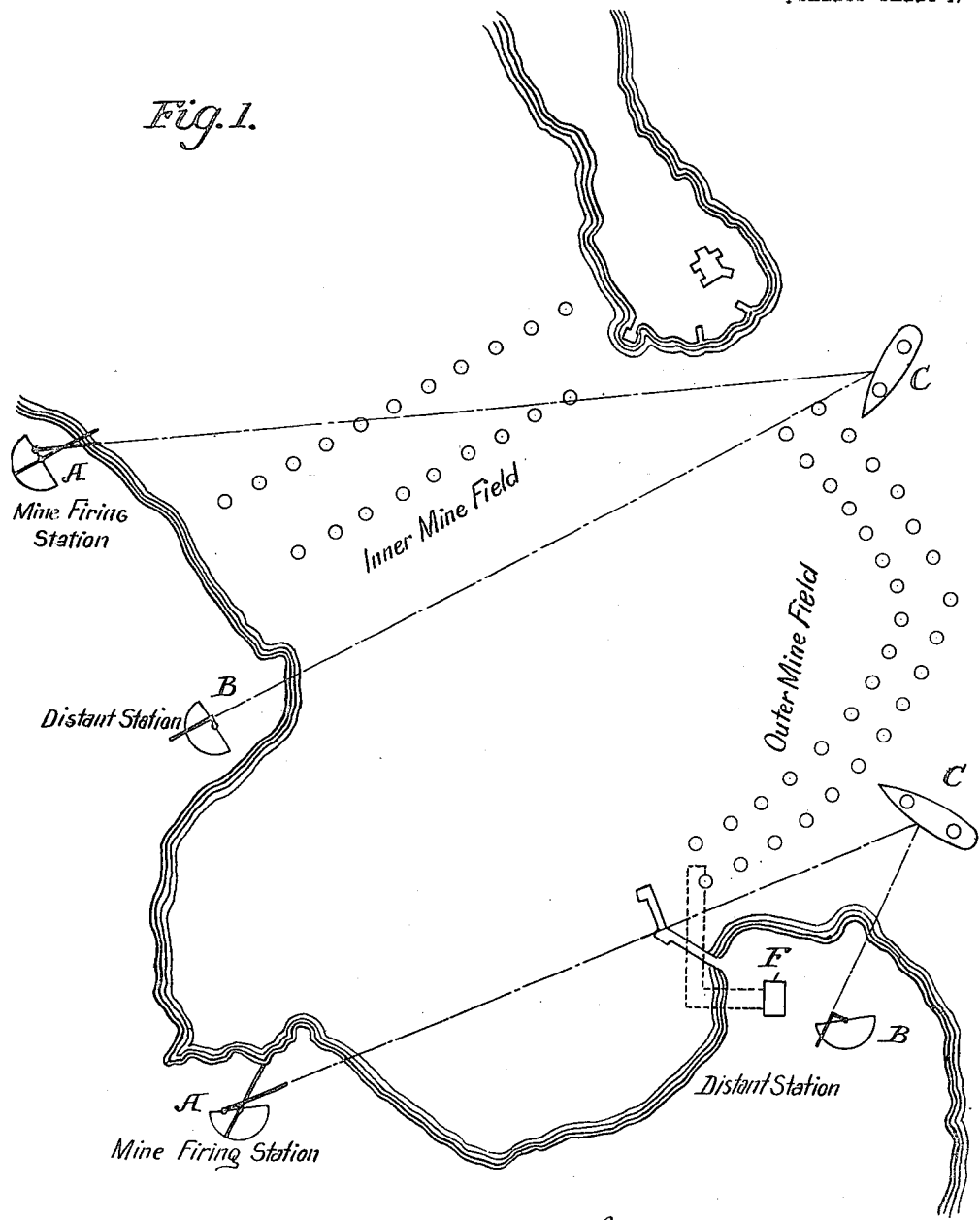

No. 793,083. PATENTED JUNE 27, 1905.
J. F. MEIGS & E. GATHMANN.
APPARATUS FOR INDICATING THE POSITIONS OF MOVING TARGETS.
APPLICATION FILED MAY 6, 1903.
4 SHEETS—SHEET 3.
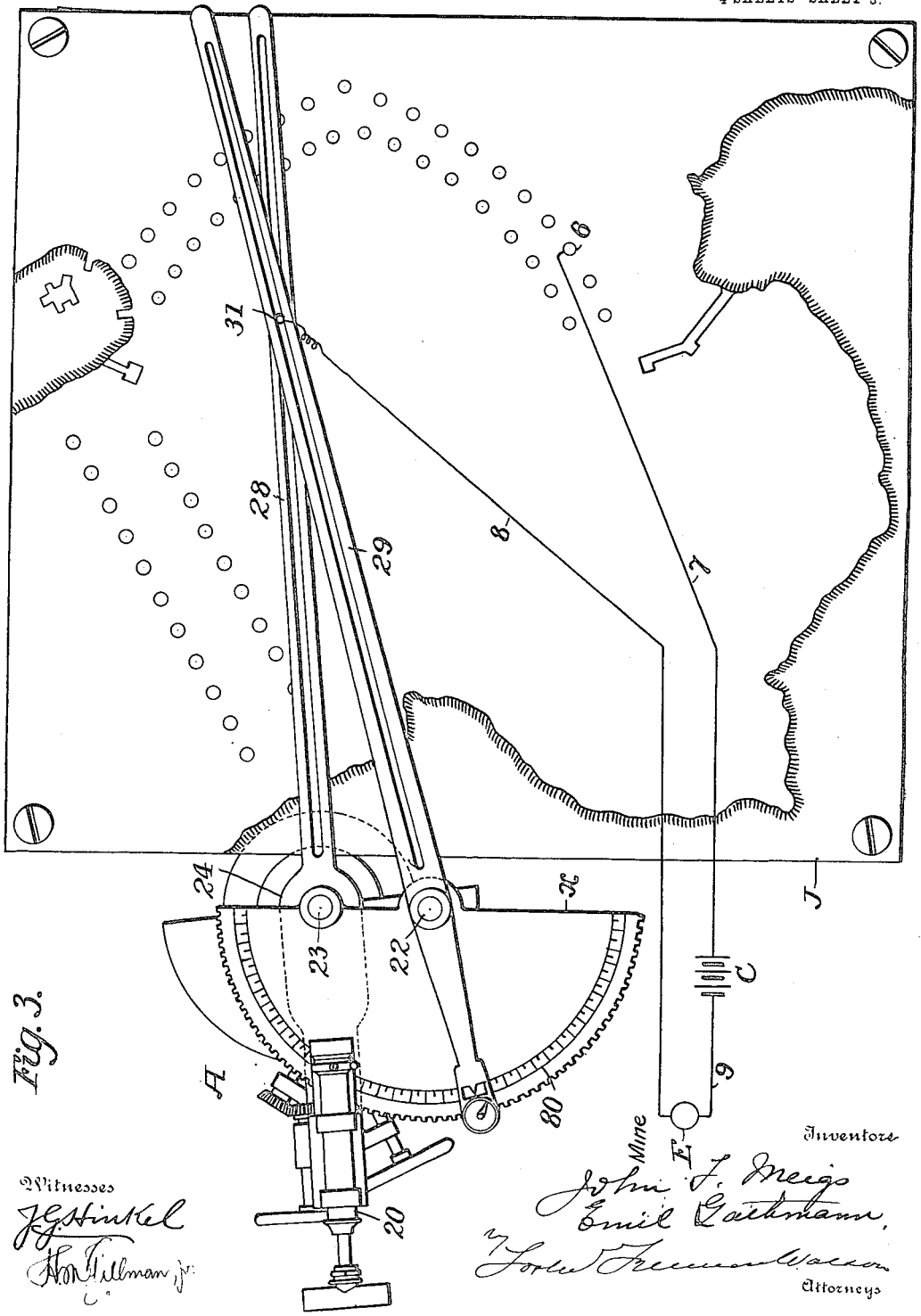

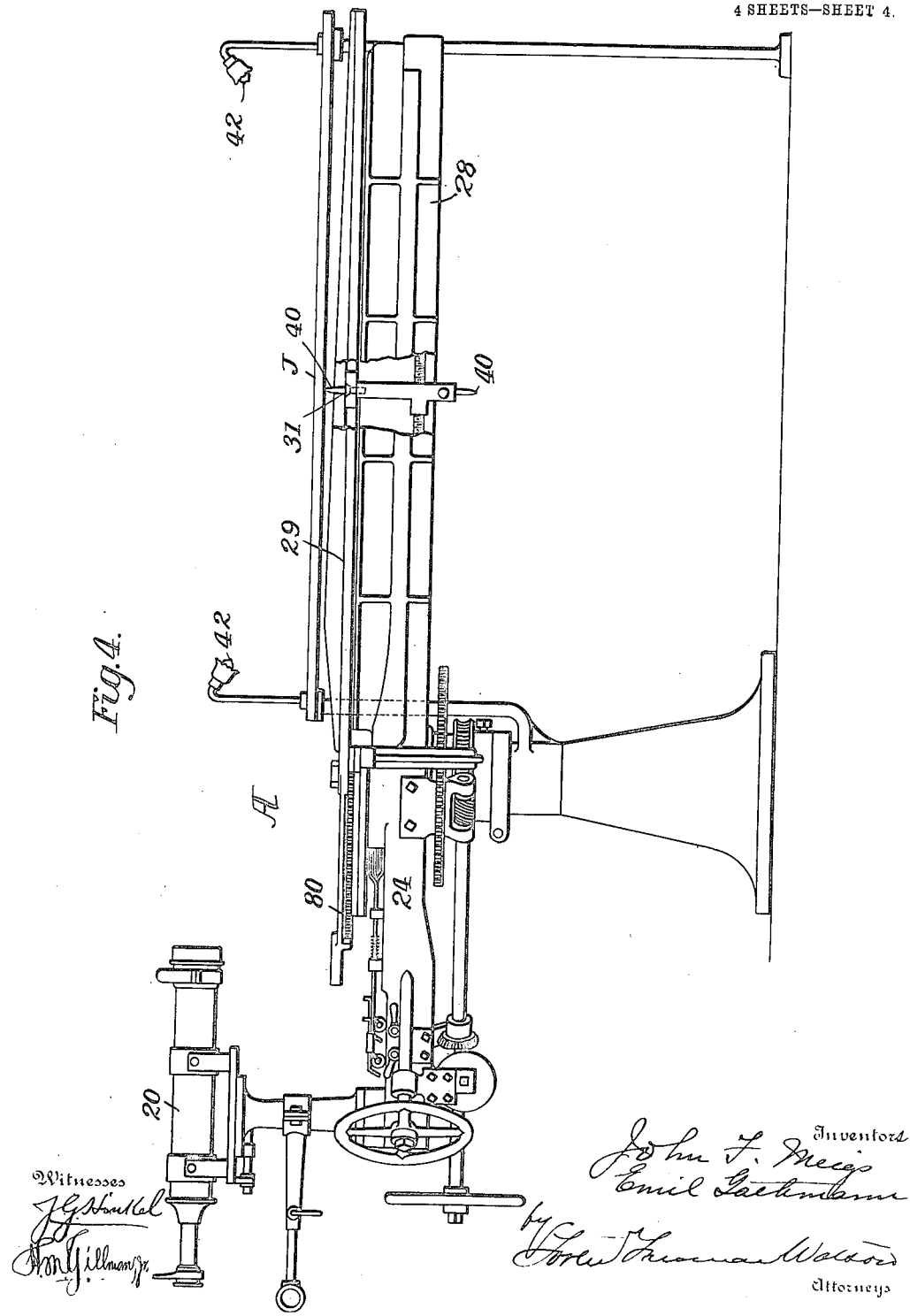

No. 793,083.

Patented June 27, 1905.

UNITED STATES PATENT OFFICE.

JOHN F. MEIGS AND EMIL GATHMANN, OF SOUTH BETHLEHEM, PENNSYLVANIA, ASSIGNORS TO BETHLEHEM STEEL COMPANY, OF SOUTH BETHLEHEM, PENNSYLVANIA, A CORPORATION OF PENNSYLVANIA.

APPARATUS FOR INDICATING THE POSITIONS OF MOVING TARGETS.

SPECIFICATION forming part of Letters Patent No. 793,083, dated June 27, 1905.

Application filed May 6, 1903. Serial No. 155,896.

*To all whom it may concern:*

Be it known that we, JOHN F. MEIGS and EMIL GATHMANN, citizens of the United States, residing at South Bethlehem, in the county of Northampton and State of Pennsylvania, have invented certain new and useful Improvements in Apparatus for Indicating the Positions of Moving Targets, of which the following is a specification.

Our invention has for its object to visually indicate by automatic means the position upon a properly-proportioned chart of a moving target in respect to the objects delineated or indicated on the chart, and more especially in connection with sea-coast defenses to indicate the position of a moving target, as a vessel, in respect to submarine mines, and to thereby directly or indirectly insure the explosion of the mine when a vessel is in position to be injured thereby, and to this end we combine a chart with an azimuth and range indicating instrument and arrange the said instrument in respect to a distant instrument, as fully set forth hereinafter and as illustrated in the accompanying drawings, in which—

Figure 1 is a view illustrating part of a seacoast and headland and the positions of two pairs of instruments and submarine mines and illustrating the relation thereto of moving targets. Fig. 2 is a view, on a larger scale, illustrating the general construction and arrangement of the station and distant instruments in relation to each other and to a battery and target. Fig. 3 is a plan of the station instrument, drawn to a larger scale, with the indicator-chart in position, the said chart indicating in miniature the coast-line, headland, and mines illustrated in Fig. 1; Fig. 4, a side elevation of the station instrument.

In carrying out this invention two instruments are employed, the instrument A being termed the "station" instrument and the instrument B termed the "distant" instrument, and a straight line between these two instruments constitutes the base or one side of a triangle, the other two sides of which will terminate at the moving target C, the dimensions of the triangle changing with the movement of the target. The distant instrument B is, in fact, a protractor provided with a graduated segmental plate 10, over which moves an arm 13, pivoted at 5, concentric with the plate and constituting part of a frame that carries a telescope or other sighting device 15. The station instrument A is likewise provided with a graduated segmental plate 80, concentric with which is pivoted at 22 an arm 29. The straight edges $x$ $x$ of the two segments coincide with or are parallel with the base-line, and on this line at a suitable point 23 distant from the point 22 is pivoted a frame 24, from which extends an arm 28 and which carries a telescope or other sighting device 20. Each arm 28 29 has a longitudinal channel receiving a block which can slide longitudinally therein, and through both blocks extends a pin or pivot 31, so that while the intersecting arms 28 29 can move freely they will always be connected at a point coincident with the axis of the sliding pivot 31. It will be seen that the points 22 23 31 constitute the terminal points of a triangle, the dimensions of which will vary with the movements of the said arms, and the parts are so proportioned that the base of the small triangle 22 23 31 bears a definite relation to or is an aliquot part of the base of the larger triangle A B C. It follows that if the telescope of the instrument B is sighted upon the target C and that at the instrument A is also sighted upon said target, and the arm 29 is then adjusted upon the segment to correspond to the adjustment of the arm 13—that is, if the arm 29 is then brought parallel to the arm 13, which may be done from information transmitted from the distant station—the smaller triangle 22 23 31 will be similar to the larger triangle A B C and will be of a definite proportion in respect to the latter, whereby whatever the movements of the target C may be the actual proportions of the triangle A B C can at once be determined at any time, thus giving the range of the target, which, together with the position in azimuth, may be transmitted by any suitable means to the guns of a battery, due allowance being made for the difference in position of the respective guns and the instrument A.

The instrument A is provided with suitable scales and other means of indicating the length of the sides of the smaller triangle from which that of the larger triangle may be estimated and which need not here be described.

In connection with the instrument A there is provided a transparent or translucent chart J', arranged in position on a transparent or translucent plate or table J, as shown in Figs. 2 and 3, and this chart has upon it a representation of the outlines of the coast adjacent to the two instruments and which it is purposed to protect by battery or mine or otherwise. This chart is drawn to the same scale in respect to the country itself that the smaller triangle bears to the larger triangle, and the chart, which is of transparent or semi-transparent material, is so arranged with respect to the instrument A that whatever may be the position of the arms 28 29 as determined by the position of the target in respect to the two instruments and the coast the intersecting point 31 of the two arms will always occupy the same position in respect to the outlines of the chart that the vessel or target itself occupies in respect to the outlines of the coast.

From the above it follows that whenever the range and position in azimuth of the target is determined by the adjustment of the instruments A B, as above described, the position of the pivot 31 upon the chart J will indicate precisely the position of the target in respect to the coast and battery, so that even at night where a light upon a vessel will permit the instruments to be properly adjusted in azimuth not only may the actual range of the target be ascertained, but an examination of the position of the pivot 31 upon the chart J will indicate at once the position of the target in respect to the coast. The translucent or transparent character of the chart allows of so mounting or assembling the instrument that the angle-arms do not obstruct the operator's view of the chart, but permit of a full and accurate view of both the chart and instrument at all times. This is the more important in connection with the operation of submarine mines arranged at any desired points and indicated upon the chart in proper position, for when the pivot 31 is adjacent any one of the indicated points it may be known that the vessel is in position near the mine which may be at once exploded.

Whenever desired, the explosion of the mine when the pivot 31 is brought on any one of the indicated positions may be effected mechanically by making the pivot 31, or an attachment thereto, and a metallic disk or point 6 on the chart, coinciding on the chart with the position of the mine, the terminals of an electric circuit including a battery and the electrical or electrically-operated exploding device of the mine. Thus a conductor 7 may extend from each metallic disk or point 6 on the chart indicating each mine to a battery G, and a conductor 8 may extend from the pivot 31 to the mine E, while another conductor 9 extends from the battery to the said mine, as indicated in the diagrams. Where it is not desired to actually explode the mine by the contact of the terminals 31 6, the terminals 6 may be in circuit with wires leading to a suitable annunciator F at the mine-firing station, where the attendant will fire the mines according to the indications of the annunciator.

The chart may be placed above or below the angle-arms of the instrument A, depending upon whether it is to be observed from above or below. If placed above, as shown in Fig. 4, it is preferable to mount the chart on a ground-glass plate J. A pencil 40 or other suitable marking device or indicator may be attached to the pivot 31, and the movement of said pivot and of the target can thus be automatically traced on either the chart or ground-glass plate, and readings of the course followed continuously. The metallic electric contact-points can obviously be placed on or in the glass plate or chart at points to represent mines, torpedoes, or other specific points. For night work the chart may be illuminated by suitable lights placed at any desired points, as at 42, Fig. 4.

In practice work with range and azimuth finders, it will be readily understood that a record of movement of target showing its positions at every moment is of great value in checking up the accuracy of observations made.

Without limiting ourselves to the specific construction of instruments shown and described, we claim—

1. In a range and azimuth finding instrument, a chart of and in reduced proportions to the territory included in the operations of said instrument, said chart of translucent material, means for indicating the position of a moving target in respect to said chart and provided with an indicating point or pivot, the said chart arranged to permit the indicating-point to be seen through the chart, substantially as set forth.

2. The combination of a range and azimuth finding instrument having a pointer or pivot for indicating the position of a movable target, and a translucent chart through which the position of the pointer in respect to the indications of the chart may be observed, substantially as set forth.

3. The combination of a range and azimuth finding instrument provided with a pointer in the form of a marking device, and a translucent chart through which the movements of the pointer may be observed and upon the under side of which the pointer produces a line indicating its travel, substantially as set forth.

4. The combination with a range and azimuth finder having intersecting arms, of means for determining the distance of a moving target by the position of the point of intersection, a transparent or translucent chart arranged adjacent to said arms to indicate the actual position of the target from objects represented on the chart by the position of the said intersecting point on said chart, a marking device carried at said point, and a ground-glass plate traversed by the marking device, substantially as set forth.

In testimony whereof we have signed our names to this specification in the presence of two subscribing witnesses.

JOHN F. MEIGS.
EMIL GATHMANN.

Witnesses:
WILLIAM E. HORNE,
EDWIN A. MILLER.